March 18, 1930.  J. E. BUSBY  1,751,393
COMBINED TRACK LEVEL AND GAUGE
Filed Feb. 12, 1929   2 Sheets-Sheet 2
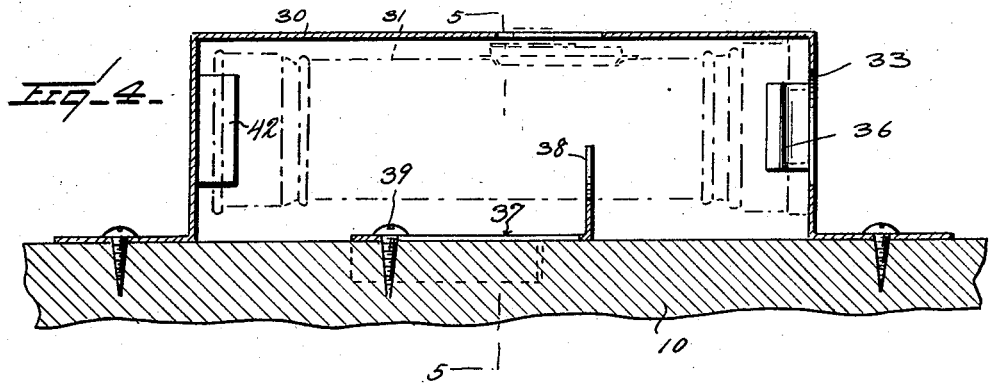
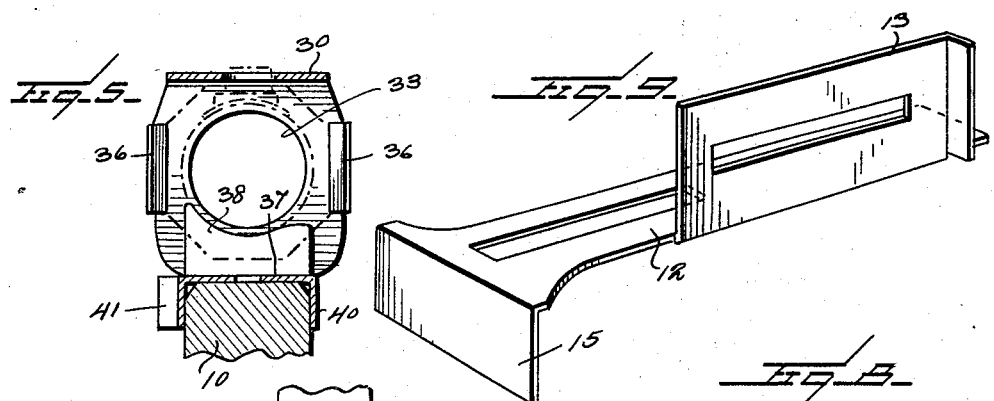
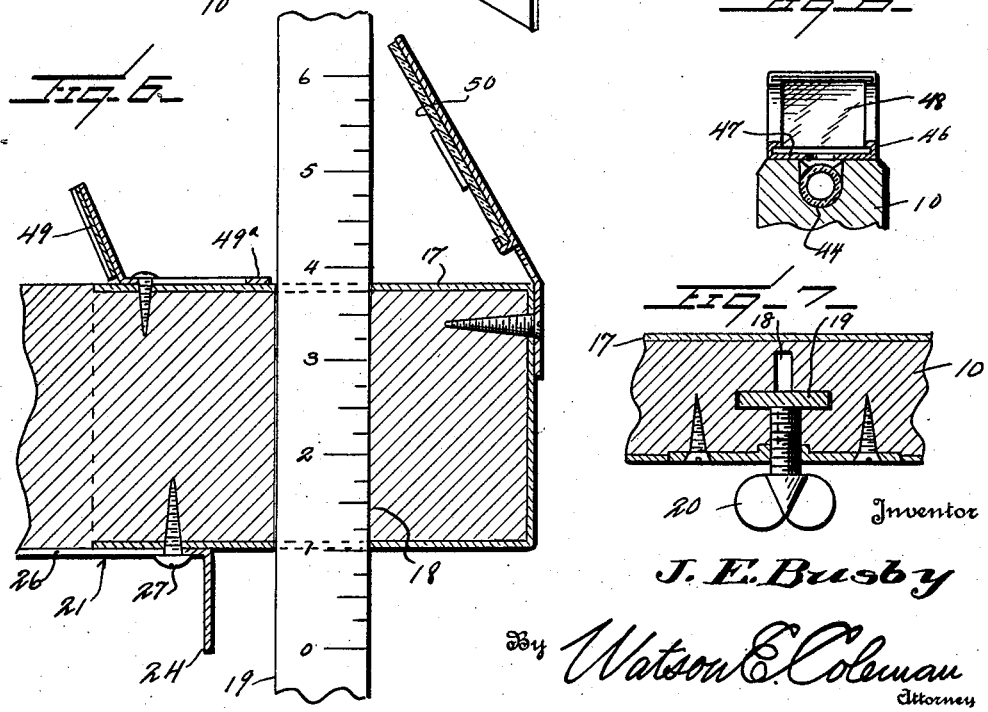
Inventor
J. E. Busby
By Watson E. Coleman
Attorney Patented Mar. 18, 1930

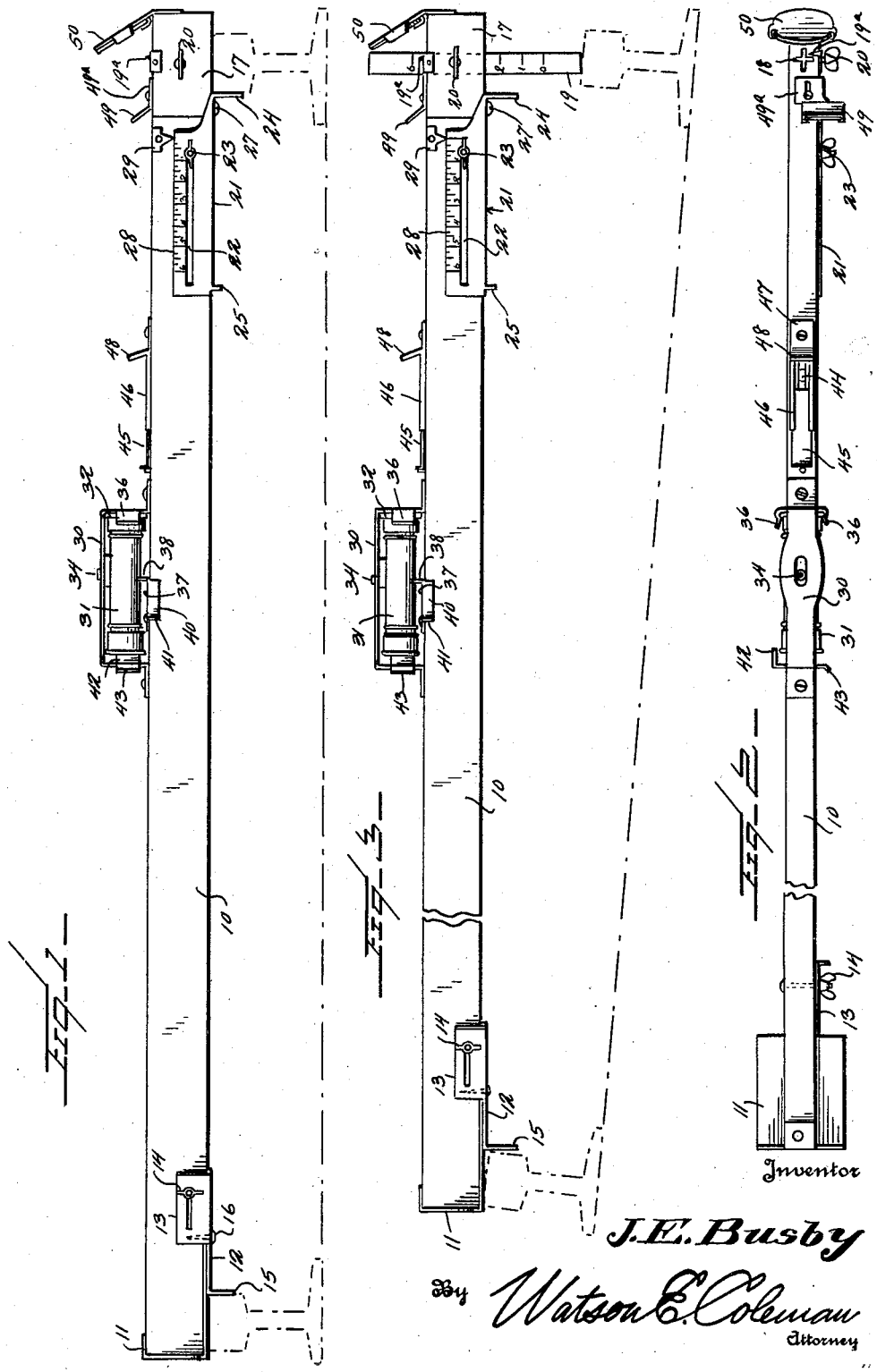

1,751,393

UNITED STATES PATENT OFFICE

JUNIUS E. BUSBY, OF JACKSON, KENTUCKY, ASSIGNOR OF ONE-HALF TO THOMAS ARTHUR GABBARD, OF OAKDALE, KENTUCKY

COMBINED TRACK LEVEL AND GAUGE

Application filed February 12, 1929. Serial No. 339,463.

This invention relates to devices for determining whether the rails of railroad tracks are properly spaced from each other or gauged and whether the rails are at a proper level either in a horizontal plane or in a plane at an inclination to the horizontal and the general object of the invention is to provide a device of this kind which is particularly adapted to be used at night or in tunnels or in other situations where the ordinary gauge is difficult or impossible to read, thus providing a combined track level and gauge which may be used immediately after an accident which may occur at night or in a tunnel so as to determine, as is necessary under these circumstances, as soon as possible after the accident, whether the rails were spread or whether the level of the track was the proper one, thus showing whether the accident was due to some defect in the track.

A further object is to provide a device of this character comprising a gauge beam having thereon a spirit level as is usual and having an adjustable gauge at its end adapted to engage the head of a rail, the other end of the beam being provided with a stop adapted to engage against the head of the other rail.

Another object of this invention is to provide a beam with an illuminating device which, by means of certain mirrors, may be made to throw a light directly upon the scales or graduations whereby the spirit level may be read and whereby the adjustment of the gauge may be indicated.

Other objects will appear in the course of the following description.

My invention is illustrated in the accompanying drawings, wherein:—

Figure 1 is a side elevation of a leveling and gauge bar constructed in accordance with my invention;

Figure 2 is a top plan view of the structure shown in Figure 1;

Figure 3 is a side elevation of the structure shown in Figure 1, showing its use when the track is sloped;

Figure 4 is a fragmentary section of the gauge bar and the handle thereof showing the flashlight in dotted lines;

Figure 5 is a section on the line 5—5 of Figure 4;

Figure 6 is a fragmentary sectional view through one end of the gauge bar showing the inclination indicating scale;

Figure 7 is a longitudinal section through the end of the gauge bar showing the means for holding the bar in adjusted position;

Figure 8 is a fragmentary section through the gauge bar and through a portion of the level;

Figure 9 is a perspective view of one of the rail indicating slides.

Referring to these drawings, 10 designates a beam which is preferably made of wood, though it may be made of any other suitable material. This beam may have any desired length. One end of the beam is provided with a shoe 11 which is relatively wide so as to have proper bearing upon a railroad rail. Mounted upon this end of the beam is a slide 12 which is angular in cross section so as to provide a flange 13 which extends up against one face of the beam and is longitudinally slotted. A stud bolt which is disposed in the beam extends through this slot and is provided with a nut 14. The under face of the slide 12 is extended toward the adjacent end of the beam and then is angularly bent as at 15. This under face is also slotted and provided with a screw 16. The other end of the beam 10 is protected by a metal cap 17. This end of the beam and the metal cap are vertically slotted at 18 to accommodate a graduated elevation measuring bar or scale 19.

Extending through one side of this metal cap 17 is a set screw 20 which engages the scale 19 and holds it in any vertically adjusted position. Also mounted upon this end of the bar is a gauge plate 21 which is angular in form and which is slotted on its side as at 22. A stud bolt extends out through the beam and through this slot and carries a wing nut 23. The under face of this slide 21 is provided with a downwardly extending flange 24 at its forward end and a downwardly extending lip 25 at its inner end and is also longitudinally slotted as at 26 and a guide screw or pin 27 passes through this slot. The side face of the slide 21 is graduated at 28 and a pointer 29 attached to the beam coacts with the graduations.

Carried upon the upper face of the beam 10 is a handle 30 which is formed to arch over the beam and is so formed as to support a flashlight 31 of ordinary form. This flashlight 31 is provided with a lens 32 at one end and this end of the handle is cut away at 33 so that the light from the flashlight may be discharged longitudinally of the beam 10 and toward one end thereof. The flashlight is also provided with the usual switch button 34 and the handle 30 is cut away just above this switch button so that the switch button is exposed. Thus the light may be flashed on or turned off. The flashlight is held in place within the handle as follows:—

On each side of the opening 33, the metal of the handle is turned backward to form lugs 36 which embrace the many sided head of the flashlight. Disposed below the flashlight and sliding upon the beam 10 is a slide 37 having an upwardly extending flange 38 which bears against the under face of the flashlight. This slide is longitudinally slotted and a set screw 39 passes through this slot and into the beam. The slide is flanged on each side as at 40 and each flange is formed with an outwardly projecting lug 41 whereby the slide may be manipulated. When this slide is shifted toward the head of the flashlight, the flange 38 will be disposed about the middle of the flashlight body and will hold the flashlight raised and locked in place. When the slide is shifted to the extreme left in Figure 1 it will permit the head of the flashlight to be dropped down or to be pushed down and the flashlight drawn out laterally.

At the end of the handle opposite the lugs 36, the handle is provided on one side with a lug 42 and on the other side with a lug 43 that extends outwardly and laterally so as to permit the ready insertion of the flashlight within the handle.

Disposed in the beam between the flashlight and the end having the scale 19 is a spirit level 44 of any usual type. This is sunk into the wood of the beam 10 and is protected by a sliding cover 45 operating in guides 46 formed upon a metal plate 47. This metal plate supports an upwardly and inwardly inclined mirror 48. The light from the flashlight will be directed against this mirror and reflected downward on to the spirit level so that the position of the bubble in the spirit level may be readily determined in the dark.

For the purpose of reading the position of the track gauge slide 21, I mount upon the cap 17 a mirror 49 which is inclined upward and toward the reflector and projects out laterally beyond the beam so that the light from the flashlight will be directed downward on to the graduations 28. This mirror is preferably mounted upon a slotted plate 49ª adjustable so that the mirror may be shifted in a position to best throw the light upon the graduations. For the purpose of illuminating the scale 19 I mount upon the end of the beam the upwardly and inwardly extending mirror or reflector 50 so angled that light from the flashlight will be reflected on to the graduations on the scale 19.

Preferably the slot 18 through which the scale 19 passes will be cruciform so as to permit the scale 19 to be disposed transverse to the longitudinal axis of the beam 10 or so that it may be disposed in the plane of this longitudinal axis as desired.

The graduations on the track gauge slide 21 will preferably be marked off in inches and fractions thereof. It will be seen that the flashlight may be readily placed in the handle and easily removed and that it does not interfere with the carrying of the gauge and when in place it merely acts as part of the handle itself.

It is now the practice on many railroads when a derailment occurs to immediately ascertain the elevation and gauge of the track for a certain distance beyond where the derailment occurred to ascertain whether or not it was due to some defect in the track. The track gauge and level which I have described permits this to be done very readily and quickly.

In the use of this device, the gauge of the track is ascertained by placing the beam on the rails with the lug 15 bearing against one of the rails and the lug 24 bearing against the other rail. Before placing the beam upon the track, both of the slides 12 and 21 are shifted to the left as far as possible. This places these slides in proper position for the standard gauge of a track which is 56½ inches apart. If it is found that the gauge is wider than the standard and it is desired to know how much wider, the wing nut for the slide 21 is released and the slide is pushed to the right until the lug 24 contacts with the rail and then this additional width over the standard gauge is read by reference to the graduations 28 coacting with the pointer 29. The reason for making the slide 12 adjustable is that it may be moved to the right in order to give more room for the beam on the ball or head of the rail when using the beam for a level only.

Where there is no inclination or slope to the track, the ends of the beam will, of course, rest upon the rails and if the track be level, this will be ascertained by reference to the spirit level 46. If, as for instance on a curve there is a slope or inclination to the track, then the scale 19 is used, one end of the beam being disposed upon the highest rail and the lower end of the scale 19 being disposed upon the head of the lower rail and then the beam shifted upward or downward upon the scale 19 until the spirit level shows that the beam is level. Then the height of one rail above the other will be indicated upon the scale 19 by the use of the pointer 19ª.

The flashlight is intended to be carried within the handle 30 and normally form part of the handle and if it be desired to move the flashlight, it is only necessary to shift the flashlight holding device 37 to the left in Figure 1 and then the flashlight may be readily disengaged so as to permit fresh batteries to be put in or so that it may be used for other purposes. Under these circumstances the beam may be carried by the handle 30.

It will be seen that the several reflectors are all held in place by screws so that the reflectors may be readily removed whenever desired.

While I have shown certain details of construction, I do not wish to be limited to these as obviously these might be changed in many ways without departing from the spirit of the invention as defined in the appended claims.

I claim:—

1. A track gauge including a beam provided at one end with a lug adapted to be disposed against the head of a rail and a slide disposed at the opposite end of the beam and provided with a lug adapted to be disposed against another rail, the slide having graduations, a pointer coacting with said graduations, and illuminating means carried on said beam and illuminating said graduations.

2. A track gauge including a beam, a member at one end of the beam having a downwardly extending lug adapted to be disposed against the inside face of a rail, a longitudinally adjustable slide mounted upon the other end of the beam and having a downwardly inclined lug adapted to be disposed against the inner face of a rail, the slide having graduations, means for holding the slide in any adjusted position, a pointer on the beam with which said graduations coact, an illuminating means carried upon the beam and a mirror mounted upon the beam and reflecting the light from said illuminating means onto said graduations and said pointer.

3. A track gauge including a beam, a member at one end of the beam provided with a lug adapted to be disposed against the inside of a rail, a member slidably mounted upon the opposite end of the beam and having a lug adapted to be disposed against the inside face of another rail, said member having graduations, a pointer coacting with the graduations, a scale sliding through this end of the beam and being disposed at right angles to the length of the beam, the scale having graduations, illuminating means carried by the beam, and means for reflecting the light from said illuminating means on to the graduations of the slide and the graduations of the scale.

4. A track gauge including a beam, a member at one end of the beam having a lug adapted to be disposed against the inside face of a rail, a longitudinally adjustable slide mounted upon the other end of said beam and having a lug adapted to be disposed against the inside face of the other rail of the track, the slide being graduated, a pointer on the beam with which said slides coact, the beam beyond the lug of said slide being formed with a passageway extending at right angles to the length of the beam, a scale adjustable vertically through said passageway and adapted to bear against the head of the rail, means for holding the scale in adjusted positions, an illuminating means carried upon the beam, and mirrors mounted upon the beam and reflecting the light from said illuminating means on to the graduations of the slide and the scale.

5. A track gauge including a beam having means thereon whereby the width of the track may be determined, a level carried upon the beam, an illuminating means carried on the beam, and means for reflecting the light from said illuminating means on to the level and onto the track gauging means.

6. A track gauge comprising a beam, a member on one end of the beam having a lug adapted to be disposed against the head of a rail on the inside face thereof, a graduated slide carried on the other end of the beam and having a lug adapted to be disposed against the other rail, a scale adjustable vertically through the last named end of the beam beyond said lug and adapted to be held in its adjusted position, a spirit level mounted upon the beam, a flash light mounted upon the beam and mirrors reflecting the light from said flashlight on to the spirit level, on to the graduations of said slide and onto the scale.

7. A track gauge including a beam, means on the beam for indicating the space between the rails and the level of the track, a handle disposed at the middle of the beam, a flashlight carried in and by the handle and having a switch, and means on the beam for reflecting the light from said flashlight onto said indicating means.

8. A track gauge including a beam, means on the beam for indicating the space between the rails and the level of the track, a handle disposed at the middle of the beam, a flashlight carried in the handle and having a switch, and means for directing the light from said flashlight on to said gauging means, the handle having a length approximately equal to that of the flashlight, one end of the handle having inwardly extending lugs adapted to embrace the head of the flashlight, the other end of the handle having means for engaging the other end of the flashlight, and a slide mounted upon the beam and shiftable from a position engaging against the middle of the flashlight and forcing it toward the handle to a position adjacent one end of the flashlight whereby to permit the removal of the flashlight.

9. A track gauge having a sliding member at one end and having a lug adapted to be disposed against the inside face of one rail, a slide mounted upon the beam adjacent the other end thereof and having a downwardly extending lug adapted to be disposed against the other rail, the slide being graduated, a pointer on said beam with which said graduations coact, a vertically movable scale carried by the beam just beyond the last named lug and adapted to be disposed against the head of the rail, a split level mounted upon the beam, a flashlight, and means on the beam for detachably holding the flashlight in a position with the light directed longitudinally of the beam and toward one end thereof, and mirrors disposed in the path of the light and carried by the beam and reflecting the light from the beam downward onto said spirit level and the graduations on the slide and the scale.

In testimony whereof I hereunto affix my signature.

JUNIUS E. BUSBY.